(12) United States Patent
Tzomik et al.

(10) Patent No.: US 8,778,482 B2
(45) Date of Patent: Jul. 15, 2014

(54) COATED SUBSTRATE AND METHOD FOR PRODUCING THE SAME

(71) Applicant: Hewlett-Packard Indigo B.V., Amstelveen (NL)

(72) Inventors: Inna Tzomik, Modiin, IL (US); Hannoch Ron, Kadima, IL (US); Igal Levine, Ness Ziona, IL (US)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 13/629,996

(22) Filed: Sep. 28, 2012

(65) Prior Publication Data
US 2014/0093706 A1    Apr. 3, 2014

(51) Int. Cl.
*B32B 3/00* (2006.01)
*B41M 5/52* (2006.01)
*B32B 29/00* (2006.01)

(52) U.S. Cl.
CPC ............... *B41M 5/52* (2013.01); *B41M 5/5254* (2013.01); *B41M 5/5218* (2013.01); *C08J 2379/08* (2013.01); *B32B 29/00* (2013.01)
USPC .................. 428/195.1; 428/473.5; 428/537.5; 427/243

(58) Field of Classification Search
CPC .... B41M 5/52; B41M 5/5254; B41M 5/5218; C08J 2379/08; B23B 29/00
USPC .................. 428/195.1, 473.5, 537.5; 427/243
See application file for complete search history.

(56) References Cited

U.S. PATENT DOCUMENTS

| | | | |
|---|---|---|---|
| 4,977,219 A | 12/1990 | Watson, Jr. | |
| 5,352,400 A | 10/1994 | West | |
| 5,929,188 A | 7/1999 | Nakamura et al. | |
| 5,936,043 A | 8/1999 | Brown | |
| 6,063,890 A | 5/2000 | Tye | |
| 6,121,406 A | 9/2000 | Imashiro et al. | |
| 6,248,819 B1 | 6/2001 | Masuda et al. | |
| 7,008,994 B1 | 3/2006 | Waki | |
| 7,425,062 B2 | 9/2008 | Bauer | |
| 2004/0151881 A1 | 8/2004 | Almog et al. | |
| 2005/0104947 A1* | 5/2005 | Ogino et al. | 347/105 |
| 2005/0238860 A1* | 10/2005 | Nakanishi et al. | 428/211.1 |
| 2006/0098066 A1 | 5/2006 | Bauer | |
| 2007/0112093 A1 | 5/2007 | Almog et al. | |
| 2010/0321454 A1* | 12/2010 | Seguchi et al. | 347/106 |
| 2011/0027546 A1* | 2/2011 | Hseih et al. | 428/200 |
| 2012/0046378 A1 | 2/2012 | Sloan | |

FOREIGN PATENT DOCUMENTS

| | | |
|---|---|---|
| EP | 0277361 A1 | 8/1988 |
| EP | 0628582 A2 | 12/1994 |
| JP | 6016988 | 1/1994 |

OTHER PUBLICATIONS

Taylor, J.W. et al., "The Application of Carbodiimide Chemistry to Coatings," Chap 8 of Technology for Waterborne Coatings, J. Glass Ed., ACS Symposium 663, 1997, pp. 137-163.
Bhattacharyya et al; Probing Interfacial Acid-Base Interactions in Ink-Substrate Adhesion, J Imaging Sci Tech, 54, 1, Jan. 2010, (6 pgs).
Hesselmans L.C.J. et al; Polycarbodiimide crosslinkers, Progress in Organic Coatings, vol. 55, Issue 2, Feb. 1, 2006, 142-148.
Leroux et al; Polypropylene film chem & phys modifications by dielectric barrier discharge plasma treatment at atmospheric press., J Colloid Interface Sci, 328, 2008, 412-420.

* cited by examiner

*Primary Examiner* — Betelhem Shewareged

(57) ABSTRACT

The present disclosure discloses a coated substrate for electrophotographic (LEP) printing comprising an ink-receiving layer and a base layer, wherein said ink-receiving layer comprises a reactive polycarbodiimide component and a method for producing the same.

17 Claims, No Drawings

COATED SUBSTRATE AND METHOD FOR PRODUCING THE SAME

BACKGROUND

Liquid electrophotographic (LEP) printing processes include applying a liquid ink onto a printing substrate (e.g. paper or plastic). A primer may be applied onto the substrate prior to printing in order to favor the transfer of the ink from the blanket cylinder to the substrate and the adhesion of the ink on the substrate.

Without primers, adhesion of printed LEP inks may not be satisfactory on certain substrates such as plastic-based substrates like polyethylene, polypropylene and polyethylene terephthalate (PET) because of their low surface energy. Some paper-based substrates may also have LEP ink adhesion-related issues.

The present disclosure discloses a coated substrate suitable for liquid electrophoretic inks, a method for producing a coated substrate and a method for performing a printing process.

DETAILED DESCRIPTION

It should firstly be noted that, for the purpose of the present specification, each and every elements, components, alternatives or embodiments of the present disclosure discussed in relation with one aspect thereof is also relevant to each and every other aspects described herein unless contradictory in context.

Primers, also known as binders, adhesion enhancers or promoters, may be used when printing with liquid toners on different substrates such as papers or plastics. They usually favor the adhesion of the ink on the substrate as well as facilitate the transfer of the ink from the blanket cylinder to the substrate.

Primers have high potency for printing industry because of their ability to promote adhesion between substrate and printing layer and enhance the mechanical resistance of the printing layer. Primers are surface modifiers which usually facilitate surface wetting and help cleaning or removing contaminations.

Thus, a primer material is needed that displays affinity for both the ink and the substrate. In the past, solvent based primers were generally used. However, the solvents currently in use are not environmentally friendly and are therefore commercially problematic.

A common way to overcome adhesion-related issues involves the application of primers. The primer can be applied on line as part of the printing process, near line or prior to printing (off line).

It is however difficult to provide a primer that is environmentally friendly and nonetheless has a high affinity for both the ink and the substrate. In general, it has been found that binders which are applied dissolved in solvents, which evaporate and leave a cured binder work best for this task. Such binders are generally acrylates. However, such primer systems do cause air pollution when the solvents evaporate.

In the present description and unless otherwise indicated, the term "environmentally friendly" refers to primers which do not contain any volatile organic compounds (VOC). Examples of such VOC include aliphatic as well as aromatic hydrocarbons, ethyl acetate, glycol ethers, ketone-based solvents such as acetone and methylethyl ketones, alcohols. Such VOC are usually used as solvent of the primer active substance to facilitate its application onto the substrate to be printed.

In practical terms, reactive polycarbodiimide primers disclosed herein may be considered suitable to be used to implement the present disclosure whenever the manufacturer's product indications advise that the product does not contain any VOC.

In the present description and unless otherwise indicated, "primers which do not contain any VOC", "VOC-free primers", VOC-free coated substrates" or "VOC-free compositions" refer to primers, coated substrates or compositions to which no VOC has been purposively added. Traces of VOC may be contained in primers or other commercially available material used in the production of the coated substrate of the present disclosure whilst they will still be referred to VOC-free. For instance, VOC-free primers may contain less than 10,000 ppm, less than 1,000 ppm or less than 100 ppm of VOC.

One aspect of the present disclosure pertains to a coated substrate suitable for use in LEP printing including an ink-receiving layer and a base layer, wherein said ink-receiving layer includes a reactive polycarbodiimide (hereinafter also "pCDI") component.

In an example, the coated substrate for LEP printing of the present disclosure is a printing and not a printed substrate, i.e. it does not contain any ink or pigment.

In the present description and unless otherwise indicated, the expression "does not contain any ink or pigment" means that no ink or pigment is purposively added as a main component to the coated substrate. This, however, does not exclude the occasional presence of residual ink or pigment particles which may be present as impurities in any of the reagents used in the manufacture of said coated substrate.

In the present description and unless otherwise indicated, "reactive polycarbodiimide component" refers to a monomer, oligomer or polymer molecules, or mixtures thereof, including on average at least two (2) carbodiimide groups per molecule. A carbodiimide group (—N=C=N—) is a linear triatomic moiety. At least one of the nitrogens will be linked to or incorporated into a backbone or other bridging group to result in a molecule having at least two carbodiimide groups. Molecules containing two or more carbodiimide groups are generally referred to as "polycarbodiimides".

Carbodiimide is a functional group represented by the formula RN=C=NR. In synthetic organic chemistry, compounds containing the carbodiimide functionality are dehydration agents and are often used to activate carboxylic acids towards amide or ester formation. Multifunctional polycarbodiimide contains several —N=C=N— groups, therefore one polycarbodiimide molecule may react with carboxyl groups on different polymer chains forming a crosslink. Without being bound to any specific theory, the carbodiimide functions of the polycarbodiimide primer used in the present disclosure are reactive as they may chemically react with the carboxylic acid functions present in the liquid electrophoretic ink to form N-acylurea (—N—C(=O)—N—C(=O)—) linkages.

In one embodiment, the reactive polycarbodiimides may be represented by Formula (I): $R^1$—(N—C—N—$R^2$—)$_x$N—C—N—$R^1$ (I), wherein $R^1$ and $R^2$ are independently alkylene or arylene, preferably having from 1 to 24 carbon atoms. It should be noted that, unless otherwise specifically stated, a lower case x in any of the chemical formulas and structures herein represents a positive integer.

Polycarbodiimides described by the above formula have been disclosed in U.S. Pat. No. 4,977,219 and EP-A-0277361. For example, pCDI of formula (I) wherein $R^1$=butyl, $R^2$=isophorone and x=3 (median value), can be made by reacting butyl isocyanate and isophorone diisocyanate in an ester solvent with phospholene oxide as a catalyst. The chain length can be controlled by the ratio of the mono and difunctional isocyanates, but there is always a distribution around the median x value.

U.S. Pat. No. 6,063,890 discloses a preparation of block copolymers of polycarbodiimides and polyacrylate, or polyurethane, or polyester or other polymer blocks.

EP-A-0628582 discloses pCDI of formula (I) wherein both $R^1$ and $R^2$ are aromatic. For example $R^1$=phenyl and $R^2$=tolyl.

EP-A-0277361 also discloses a mixed aliphatic and aromatic polycarbodiimide cross-linker, wherein each molecule contains some aliphatic and some aromatic carbodiimides.

Polycarbodiimides may be polymers with a plurality of carbodiimide groups appended to the polymer backbone. For example, U.S. Pat. No. 5,352,400 discloses polymers and co-polymers derived from alpha-methylstyryl-isocyanates.

Polycarbodiimides may have branched structures, as described in Chapter 8 of Technology for Waterborne Coatings, E. J. Glass Ed., ACS Symposium 663, 1997; The Application of Carbodiimide Chemistry to Coating, by J. W. Taylor and D. R. Bassett (the disclosures of which are incorporated by reference herein for all purposes as if fully set forth).

These branched structures are prepared by reacting a multifunctional branched amine with an alkyl or aryl isocyanate, and then dehydrating the resulting urea compound to the carbodiimide. The branched amine could also be a dedrimeric amine containing more than three amino groups, leading to a dendrimeric polycarbodiimide. An advantage of this type of structure is that the distribution of the number of carbodiimide groups in the pCDI species is narrower than those species described earlier.

Polycarbodiimide species for waterborne applications contain hydrophillic groups which allow them to be water soluble or dispersible. These materials can be made by condensing aliphatic or aromatic di-isocyanates, and then reacting the terminal isocyanate groups on the linear carbodiimide polymer with a hydrophilic species, e.g., an alkyl-capped polyethylene oxide.

U.S. Pat. No. 6,121,406 describes a hydrophilic pCDI species in which the isocyanate endgroups on the precursor are reacted with a mixture of monohydroxy compounds of different hydrophilic character, e.g., polyethylene oxide monoalkyl ether and polypropyleneoxide monoalkyl ether.

U.S. Pat. No. 5,929,188 describes pCDI species that contain at least four molecular chains bonded independently to a backbone. Each of the molecular chains contains at least one carbodiimide group. The polyfunctional carbodiimide species can be produced by reacting (a) an isocyanate compound having at least one carbodiimide group and at least one isocyanate group with (b) a polyol, polyamine and/or amino alcohol having at least four hydroxyl, primary amino and/or secondary amino groups in a molecule.

Aliphatic polycarbodiimides containing sulfur- or phosphorous-containing acid groups are disclosed in U.S. Pat. No. 5,936,043. These are relatively non-toxic, water soluble non-yellowing crosslinkers for coating layers.

U.S. Pat. No. 6,248,819 describes polycarbodiimide compounds modified for hydrophilicity, which have a structure such that a carbodiimide unit and a polyol unit occur alternately via a urethane bond, and a hydrophilic unit occurs at both molecular termini and is bound to such carbodiimide unit via a urethane bond. The number of repetitions of the carbodiimide unit and polyol unit are preferably 1 to 10.

Suitable polycarbodiimides for implementing embodiments of the present disclosure may be those having any one of the structures (II) to (XIII) as disclosed in U.S. Pat. Appl. No. 2006/0098066. Other suitable examples are polycarbodiimides discussed by Hesselmans et. al in Progress in Organic Coatings 55 (2006) 142-148.

Examples of commercial compositions including suitable polycarbodiimide components include but are not limited to those known under the following trademarks: SV-02 Carbodilite®, UcarInk® XL-29SE® (Union Carbide), EX-5558® (from Stahl Holland by), Carbodilite® E02, E04, V02, V04 (manufactured by Nisshinbo Holdings Inc.), NK Assist CI® (manufactured by Nicca Chemical Co., Ltd.), and the like.

In one embodiment of the present disclosure, the base layer is a polymeric layer as it includes a plastic-based material including, but not limited to, polyolefins such as polyethylene, HDPE and LDPE, Linear low density polyethylene (LLDPE), fluted polyolefins such as fluted polyethylene available under the name COROPLAST, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, PVC, expanded foam PVC such as Sintra®, Celtec®, and foam board, metalized polymeric films. Good results were obtained on thermoplastic substrates such as bi-oriented polypropylenes (BOPP), polyesters or polyvinylchlorides (PVC).

In another embodiment of the present disclosure, the base layer is a lignocellulosic layer as it includes a paper or any lignocellulose-containing material. Good results were obtained on paper substrates such as UPM Finesse 135 gr./$m^2$, Kymi papers and pulp mills, multifine 130 gr./$m^2$ papers and rough papers for wine labels.

In the present description and unless otherwise indicated, an ink-receiving layer refers to a layer which is adapted to receive at least one LEP ink on its surface. Inks suitable for implementing embodiments of the present disclosure include, for instance, LEP inks based on ethylene acrylic acid or ethylene methacrylic acids, or ethylene vinyl acetates. In one embodiment, the ink is a LEP ink such as an ink including carboxylic acid groups, for example a (meth)acrylic acid based ink which does not contain any polycarbodiimide compound.

Another aspect of the present disclosure pertains to a printed sheet including the coated substrate of the present disclosure as described above and an image printed on the substrate. Such printing may be achieved using electrophotographic printing.

In the present description and unless otherwise indicated, "electrophotographic printing" refers to the process that provides an image that is transferred from a photo imaging substrate either directly or indirectly via an intermediate transfer member. As such, the image is not substantially absorbed into the photo imaging substrate on which it is applied. Additionally, "electrophotographic printers" refers to those printers capable of performing electrophotographic printing, as described above. "Liquid electrophotographic printing" is an electrophotographic printing where a liquid ink is employed rather than a powder toner.

Suitable printing systems for realizing the printed sheet of the present disclosure include any of the HP® digital indigo printing machines.

Yet another aspect of the present disclosure refers to a method for producing a coated substrate which includes the coating of a substrate with a composition including a solvent and a reactive polycarbodiimide component.

Suitable compositions for implementing embodiments of the present disclosure include solutions, suspensions or colloidal solutions, including a solvent and a reactive polycarbodiimide component. However, good results were observed using solutions including a solvent and a reactive polycarbodiimide component.

Suitable reactive polycarbodiimide components for implementing embodiments of the present disclosure are as already defined in the above disclosure.

Suitable solvents for implementing embodiments of the present disclosure include any solvents exempt from VOCs. Good results were obtained with VOC-free solvents such as water.

It should be noted that the composition used for implementing the methods of the present disclosure may be of various concentrations depending on the application foreseen. For instance, solutions containing between 5% and 40% w/w of said carbodiimide component in water are suitable. Good results were nonetheless obtained using a 10% solution in water.

Polycarbodiimide compositions suitable for the purposes of the present disclosure may be obtained commercially, for instance, from Nisshinbo Japan under the name of SV-02 Carbodilite® or produced using standard methods. Carbodilite® SV-02 is defined by the manufacturer as a water solution of a polycarbodiimide component having about 40% by weight solid content, a viscosity of about 100 mPa per second calculated at 20° C., and having a carbodiimide equivalent weight of about 430 expressed as chemical formula weight for 1 mole of carbodiimide group (—NCN—).

In one embodiment, the method further includes, prior to the coating of the substrate, the priming of the substrate with one or more priming method such as a corona discharge treatment, to improve coating ability of the ink-receiving layer.

Additionally, and if a further improved coating ability of the ink-receiving layer is desired, a step of priming the substrate with an ethylene acrylic/methacrylic acid based primer may also be performed prior to the coating of the substrate. These primers are commercially available (e.g. DigiPrime® 4431 from Michelman).

In one embodiment of the present disclosure, the substrate may be selected from the polymeric or lignocellulosic substrates already described above.

Yet another aspect of the present disclosure pertains to a coated substrate produced by a method for producing a coated substrate as described above.

Another aspect of the present disclosure refers to a method for performing a LEP printing process which includes the provision of a coated substrate of the present disclosure, the printing of an image on the substrate using a LEP ink and the fixing of the image to the coated substrate.

Accordingly, another aspect of the present disclosure pertains to a method for promoting the adhesion of an ink to a substrate in a LEP process, said method including coating said substrate with a composition including a solvent and a reactive polycarbodiimide component.

Further embodiments and advantages will become apparent to a skilled reader in light of the examples provided below.

EXAMPLES

Materials

Commercial aqueous solution of polycarbodiimide, SV-02 Carbodilite® manufactured by Nisshinbo Japan was used.
Polymeric substrates:
1. Bi oriented polypropylene (BOPP) 38 micron thick
2. Polyester 38 micron thick
3. Poly vinyl chloride (PVC) 38 micron thick
Paper substrates:
1. UPM Finesse 135 gr./m2 from UPM, Kymi paper and pulp mill
2. Multifine 130 gr./m2 from StoraEnso
3. Rough paper for wine labels (supplied by Nirotek, Israel), General Procedure for Gravimetric Measurements The coat weight of polycarbodiimide primer was determined gravimetrically by a procedure described below.

The mass of primer applied was calculated by determining the mass of primer left in the syringe and the mass of primer collected from the coating Teflon film after coating. The primer was collected from the Teflon film using a pre weighted linter free piece of cloth. The mass added to the pre weighted linter free piece of cloth was added to the mass of the primer left in the syringe. The sum was subtracted from the initial amount of liquid in the syringe. The coating was applied on a defined surface area.

The effective dry coat weight varied between 0.1-0.2 g.s.m

General Procedure for the Production of Coated Substrates of the Present Disclosure A substrate was mounted and fastened to a coating board from RK Print Coat Instruments Ltd UK. The coating board was covered by a Teflon film. The substrate to be coated was mounted on the Teflon film. A smooth stainless steel rod (2 cm diameter, long enough to cover the substrate width) was placed at the top of the substrate.

The polycarbodiimide 10% solution in water was spread along the smooth rod using a syringe. The solution was applied by sliding the rod while applying pressure down the substrate. The primer solution dried within few minutes and there was no need for any drying action prior to printing.

General Procedure for Printing onto Coated Substrates

A treated substrate was introduced into an Indigo printing machine immediately after coating. Liquid Electro Photography (LEP) inks (ElectroInk 4.5 Cyan) were printed by HP Indigo 5000 press.

Application of Carbodilite® SV-02 Using Coating System Prior to Printing

Carbodilite® SV-02 was applied using ABG International (UK) coating system. Substrate PET 12 micron (JOLIBAR, FILMTECHNICS PRODUCTS CONVERTING (1987) LIMITED), Coating speed 30 m/min, corona power 400 W, drying oven temperature 80° C. Printing on the coated PET roll was performed using HP Indigo WS6600 printing system.

Adhesion Evaluation: Peel Test Procedure

The effect of the discussed primer was evaluated by performing a peel test according to FINAT test method (FTM 21 Test Method no. 21). In this test a paper tape (Scotch drafting tape #230 3M) is applied to the print using a 2 Kg rubber coated metal roller. The resistance to peeling is evaluated by determining the amount of ink peeled off from the print by detaching the tape from the tested print.

Polymeric substrates were glued on a paper substrate Condat 130 g.s.m to enable to print these thin substrates in HP Indigo 5000 press.

The adhesion of ElectroInk 4.5 Cyan ink to the following paper substrates was improved dramatically (i.e. the ink was not significantly removed from the print during the peeling test) when primed with the polycarbodiimide aqueous solution of the present disclosure:
1. UPM Finesse 135 gr./m2 from UPM, Kymi paper and pulp mill
2. Multifine 130 gr./m2 from StoraEnso 3. Rough paper for wine labels (supplied by Nirotek, Israel), The adhesion of the above ElectroInk to the following polymeric substrates was also improved significantly (i.e. the ink was not significantly removed from the print during the peeling test) after exposure of the substrates to corona, with power of 400 W prior to being primed with the polycarbodiimide primer of the present disclosure:

1. Bi oriented polypropylene (BOPP) 38 micron thick
2. Polyester 38 micron thick
3. Poly vinyl chloride (PVC) 38 micron thick Peeling results were observed to be comparable with the common primer DigiPrime® and Michelman ILP 30® from Michelman.

The chemical reactivity of the reactive polycarbodiimides of the present disclosure makes them also suitable to be used as adhesion enhancers for existing non-reactive primers. For example, when 10% of SV-02 multifunctional polycarbodiimide was added to a non-reactive primer (ILP 040 from Michelman), improved adhesion was observed between the ink and the PET substrate as per the above-described peel test procedure.

The present disclosure thus discloses at least the following aspects and advantages:

a coated substrate and method for producing the same including a polycarbodiimide primer suitable for liquid electrophoretic inks that at least has good adhesive properties for both liquid ink and substrates such as plastics and papers, and which allows at least for enhanced mechanical resistance of the ink layer, whilst being environmentally friendly;

a coated substrate and method for producing the same which includes a polycarbodiimide primer which may be applied onto the desired substrate from a composition such as a solution, suspension or dispersion which is free of VOC. Good results were obtained using an aqueous solution of primer;

a technical solution which facilitates the coating of a primer onto substrates;

a versatile method for producing coated substrates which may be used with either paper-based and polymeric substrates;

a method for producing coated substrates that does not present VOC-related health risks for the users; and a method for producing coated substrates which is simple and cost effective.

The invention claimed is:

1. A coated substrate for liquid electrophotographic (LEP) printing, comprising an ink-receiving layer and a base layer, wherein said ink-receiving layer consists of a reactive polycarbodiimide component including at least two carbodiimide groups (—N=C=N—).

2. The coated substrate according to claim 1, wherein said base layer is a polymeric layer or a lignocellulosic layer.

3. A printed sheet, comprising:
a coated substrate according to claim 1; and
an image printed on the substrate, the image formed of a liquid electrophotographic ink.

4. A method for producing a coated substrate, comprising coating a base layer with a composition to form an ink-receiving layer consisting of a reactive polycarbodiimide component including at least two carbodiimide groups (—N=C=N—), the composition consisting of a solvent and the reactive polycarbodiimide component that includes the at least two carbodiimide groups (—N=C=N—).

5. The method according to claim 4, wherein the solvent is water.

6. The method according to claim 4, wherein the composition consists of between 5% and 40% w/w of said reactive polycarbodiimide component in water.

7. The method according to claim 4, wherein the composition consists of 10% of said reactive polycarbodiimide component in water.

8. The method according to claim 4, wherein the method further comprises, prior to the coating of the base layer, priming the base layer using a corona treatment.

9. The method according to claim 4, wherein the base layer is selected from the group consisting of polyolefins, fluted polyolefins, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, PVC, expanded foam PVC and metalized polymeric films.

10. A coated substrate for liquid electrophotographic (LEP) printing, consisting of:
a base layer selected from the group consisting of fluted polyolefins, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, expanded foam PVC and metalized polymeric films; and
an ink-receiving layer consisting of a water soluble or water dispersible reactive polycarbodiimide component that includes at least two carbodiimide groups (—N=C=N—), the at least two carbodiimide groups to chemically react with carboxylic acid functional groups present in a subsequently deposited liquid electrophoretic ink.

11. A method for performing a LEP printing process, comprising:
providing a coated substrate according to claim 1;
printing an image on the ink-receiving layer of said coated substrate using a LEP ink including carboxylic acid groups to chemically react with the at least two carbodiimide groups in the ink-receiving layer; and
fixing the image to the coated substrate.

12. A method for promoting the adhesion of an ink to a substrate in a LEP printing process, said method comprising coating said substrate, which is a base layer, with a composition consisting of a solvent and a reactive polycarbodiimide component including at least two carbodiimide groups (—N=C=N—), thereby forming an ink-receiving layer consisting of the reactive polycarbodiimide component which includes the at least two carbodiimide groups (—N=C=N—).

13. The coated substrate according to claim 1 wherein the base layer is selected from the group consisting of fluted polyolefins, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, expanded foam PVC and metalized polymeric films.

14. The coated substrate according to claim 1 wherein:
the reactive polycarbodiimide component has the formula (—(N—C—N—R$^2$—)$_n$N—C—N—R$^1$; and
R$^1$ and R$^2$ are independently selected from an alkylene or an arylene having from 1 to 24 carbon atoms, and X is a positive integer.

15. The coated substrate according to claim 1, further comprising a layer of an ethylene acrylic acid based primer or an ethylene methacrylic acid based primer between the base layer and the ink-receiving layer.

16. The printed sheet according to claim 3 wherein the liquid electrophotographic ink includes carboxylic acid groups that chemically react with the at least two carbodiimide groups in the ink-receiving layer to form N-acylurea (—N—C(=O)—N—C(=O)—) linkages.

17. The printed sheet according to claim 16 wherein the carboxylic acid groups are groups of ethylene acrylic acid or ethylene methacrylic acid.

* * * * *

UNITED STATES PATENT AND TRADEMARK OFFICE
CERTIFICATE OF CORRECTION

PATENT NO. : 8,778,482 B2  Page 1 of 1
APPLICATION NO. : 13/629996
DATED : July 15, 2014
INVENTOR(S) : Inna Tzomik et al.

It is certified that error appears in the above-identified patent and that said Letters Patent is hereby corrected as shown below:

In the Claims,

In column 8, line 64, in Claim 14, delete "$R^2\!-\!)_n$" and insert -- $R^2\!-\!)_x$ --, therefor.

In column 8, line 64, in Claim 14, delete "$-\!R^1$" and insert -- $-\!R^1)$ --, therefor.

Signed and Sealed this
Sixth Day of January, 2015

Michelle K. Lee
*Deputy Director of the United States Patent and Trademark Office*